United States Patent
Akizuki

(10) Patent No.: US 11,442,861 B2
(45) Date of Patent: Sep. 13, 2022

(54) SEMICONDUCTOR DEVICE AND CACHE CONTROL METHOD

(71) Applicant: FUJITSU LIMITED, Kawasaki (JP)

(72) Inventor: Yasunobu Akizuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/337,048

(22) Filed: Jun. 2, 2021

(65) Prior Publication Data

US 2022/0027274 A1    Jan. 27, 2022

(30) Foreign Application Priority Data

Jul. 22, 2020   (JP) .............................. JP2020-125524

(51) Int. Cl.
*G06F 12/00*   (2006.01)
*G06F 12/0842*   (2016.01)
*G06F 12/0875*   (2016.01)

(52) U.S. Cl.
CPC ...... *G06F 12/0842* (2013.01); *G06F 12/0875* (2013.01); *G06F 2212/601* (2013.01)

(58) Field of Classification Search
CPC ............. G06F 12/0842; G06F 12/0875; G06F 2212/601
See application file for complete search history.

(56) References Cited

U.S. PATENT DOCUMENTS 4,315,312 A * 2/1982 Schmidt .............. G06F 12/0864
                                                    711/172
2008/0256303 A1* 10/2008 Croxford ............ G06F 12/1027
                                                    711/144

FOREIGN PATENT DOCUMENTS

JP        2006-510992 A      3/2006
WO        2004/061675 A1     7/2004

* cited by examiner

*Primary Examiner* — Gurtej Bansal
(74) *Attorney, Agent, or Firm* — Fujitsu Patent Center

(57) ABSTRACT

A semiconductor device includes a plurality of cores, each including an instruction execution circuit and a first cache, and a second cache shared by the plurality of cores. In each of the cores, a number of completed instructions for each type of the instructions executed by the instruction execution circuit are counted, and an execution frequency for each type of instructions are calculated. Based on the execution frequencies, a cache line size preferable for use in the first cache in the core is selected. Based on the selected preferable cache line sizes for the cores, a cache line size used in the first caches and the second cache is determined.

16 Claims, 9 Drawing Sheets

SEMICONDUCTOR DEVICE AND CACHE CONTROL METHOD

CROSS-REFERENCE TO RELATED APPLICATION

This application is based upon and claims the benefit of priority of the prior Japanese Patent Application No. 2020-125524, filed on Jul. 22, 2020, the entire contents of which are incorporated herein by reference.

FIELD

The embodiment discussed herein is related to a semiconductor device and a cache control method.

BACKGROUND

A semiconductor device such as a processor includes a cache that may be accessed at a higher speed than a main memory. The cache is arranged between a processor core and the main memory, and holds a part of data stored in the main memory. A size of a cache line, which is a unit of data input/output to/from the cache, is preferably set to a size that enables efficient access to data. For example, a cache that may change a cache line size according to a task executed by a processor is known (refer to, for example, Japanese National Publication of International Patent Application No. 2006-510992).

SUMMARY

According to an aspect of the embodiments, a semiconductor device includes: a plurality of cores each including an instruction execution circuit that executes an instruction and a first cache that holds an instruction or data used in the instruction execution circuit or combination of the instruction and the data; a second cache shared by the plurality of cores; and a cache control circuit that controls switching of a cache line size used in the first cache and the second cache, wherein each of the plurality of cores includes an instruction collection circuit that collects, at time intervals during a collection period, a number of completed instructions for each type of the instructions that are executed by the instruction execution circuit, and calculates an execution frequency for each type of instructions at an end of the collection period, and a first selection circuit that selects a cache line size preferable for use in the first cache based on the execution frequency calculated by the instruction collection circuit during the collection period, and the cache control circuit determines a cache line size used in the first cache and the second cache based on cache line sizes selected by the first selection circuit of the plurality of cores.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For improved performance, recent processors may include a plurality of cores, each including a first cache, and a second cache shared by the plurality of cores. When data used by the core is held in a memory area in a distributed manner, a frequency of cache misses is reduced and access efficiency is improved by reducing a cache line size and increasing the number of pieces of data that may be registered in a cache. On the other hand, when data used by the core is held collectively in a continuous range of the memory area, access efficiency is improved by increasing a cache line size and reducing the number of transfers to a cache. However, in a semiconductor device including a plurality of cores, each including a first cache, and a second cache shared by the plurality of cores, a method for improving access efficiency by switching a cache line size has not been proposed.

In one aspect, an object of an embodiment is to improve access efficiency by appropriately switching a cache line size in a semiconductor device including a plurality of cores, each including a first cache, and a second cache shared by the plurality of cores.

Hereinafter, an embodiment will be described with reference to the drawings.

Figure 1:
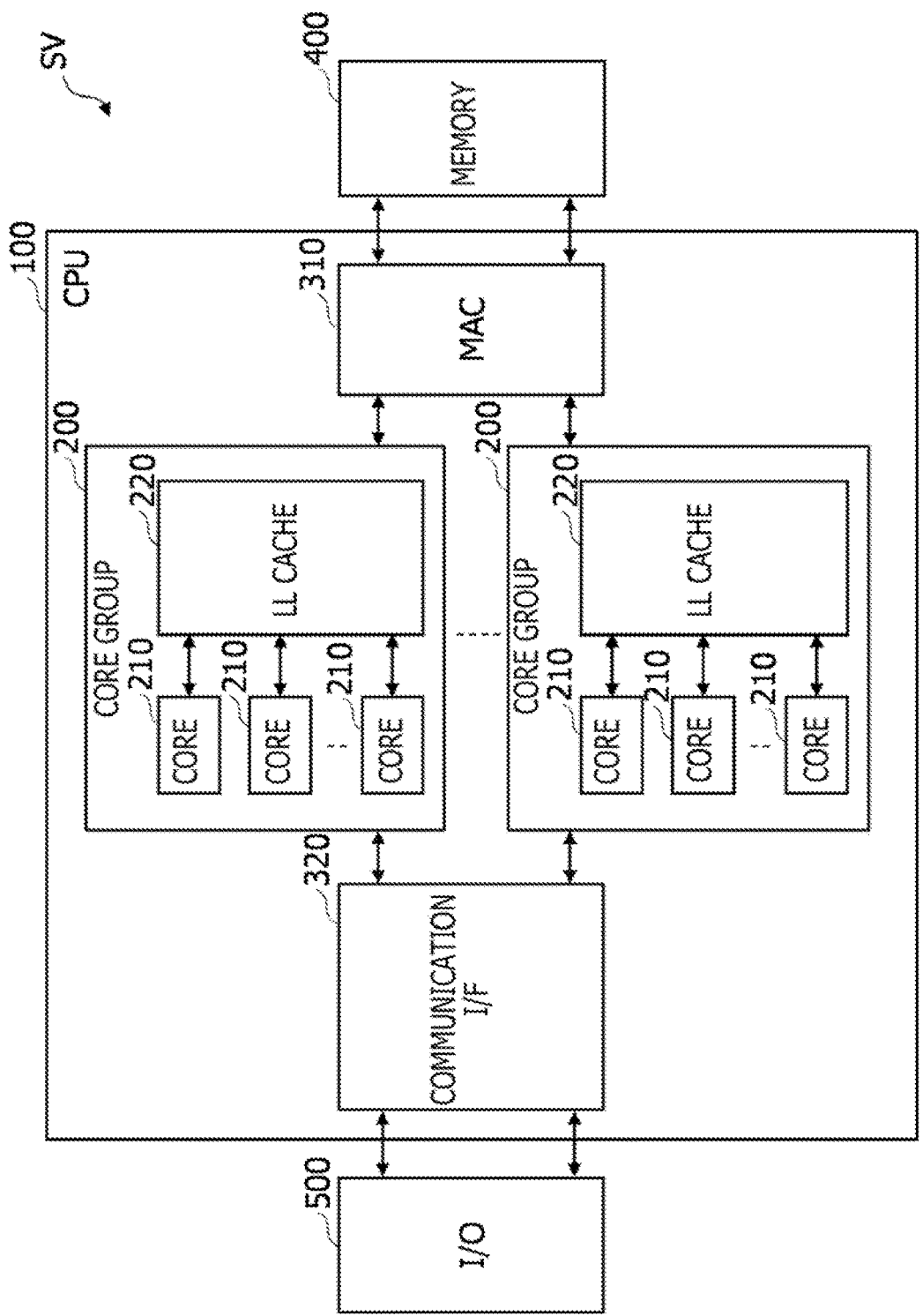
FIG. 1 is a block diagram illustrating an example of a semiconductor device according to an embodiment.

FIG. 1 illustrates an example of a semiconductor device according to an embodiment. The semiconductor device illustrated in FIG. 1 is, for example, a central processing unit (CPU) 100. The CPU 100 includes a plurality of core groups 200, a memory access controller (MAC) 310, and a communication interface (I/F) 320 Each core group 200 includes a plurality of cores 210 and a last level (LL) cache 220 shared by the plurality of cores 210. The LL cache 220 is an example of a second cache. Note that the CPU 100 may include a single core group 200.

Each core group 200 is connected to a memory 400 via the memory access controller 310 and is connected to an input/output device (I/O) 500 via the communication interface 320. An example of the core group 200 is described with reference to FIG. 2. For example, the memory 400 is a main memory and includes a dynamic random access memory (DRAM). For example, the communication interface 320 is a peripheral component interconnect express (PCIe) interface. Note that each core group 200 may be connected to a core group 200 of another CPU 100 via the communication interface 320.

The LL cache 220 of each core group 200 determines a cache hit/miss based on an access request from the core 210.

At the time of a cache hit, the LL cache 220 outputs a cache line held corresponding to a hit address to the core 210 that issued the access request. At the time of a cache miss, the LL cache 220 issues an access request to the memory 400 via the memory access controller 310, and holds data (cache line) transferred from the memory 400. The LL cache 220 outputs, to the core 210 that issued the access request, data corresponding to the access request among the data in the held cache line.

Figure 2:
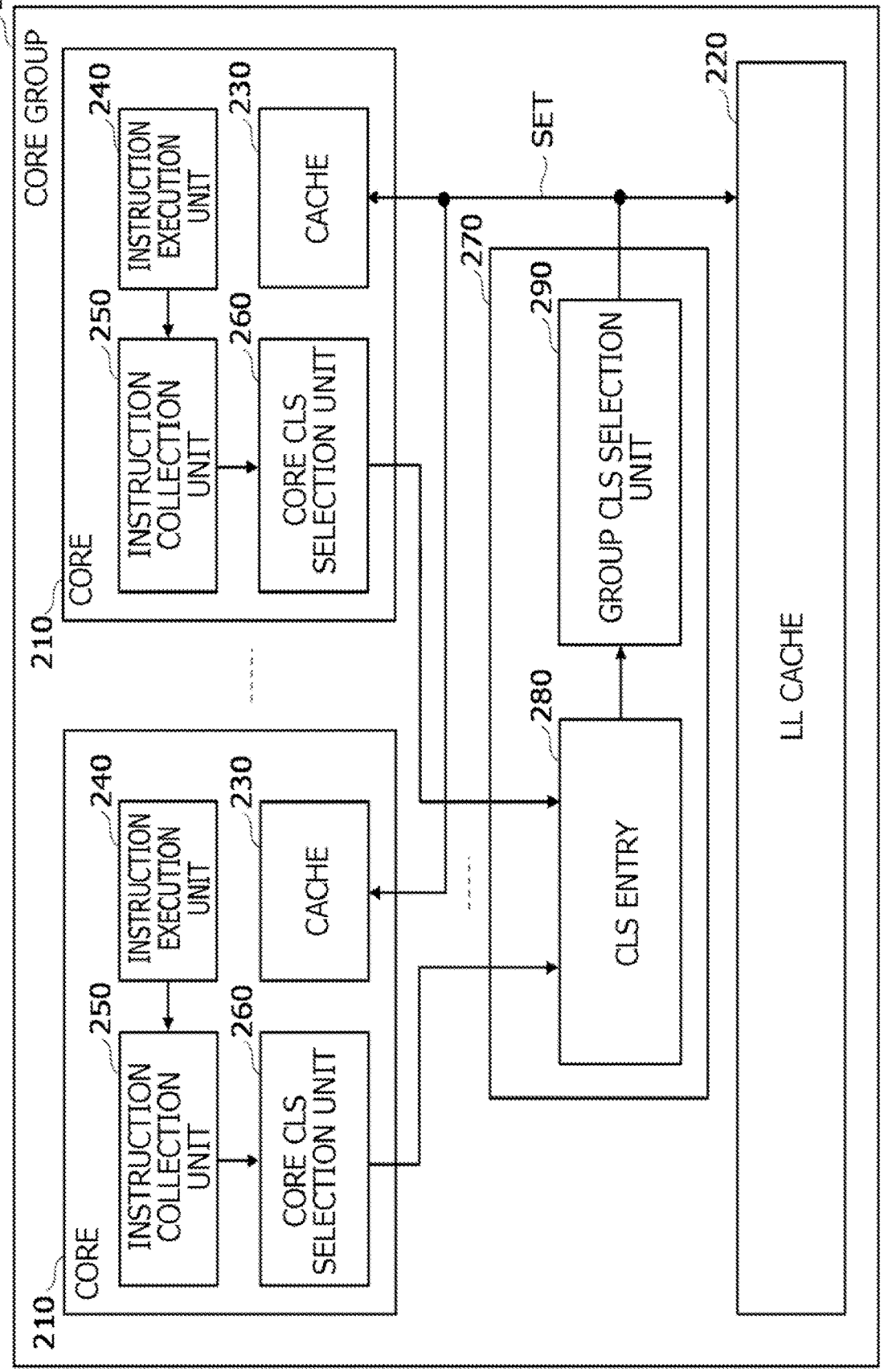
FIG. 2 is a block diagram illustrating an example of a core group in FIG. 1.

FIG. 2 illustrates an example of the core group 200 in FIG. 1. The core group 200 includes, in addition to the plurality of cores 210 and the LL cache 220 illustrated in FIG. 1, a cache control unit 270 including a cache line size (CLS) entry 280 and a group CLS selection unit 290. Note that arrows illustrated in FIG. 2 indicate signal flows associated with change in cache line size, and arrows indicating instruction and data flows are not illustrated. Each core 210 includes a cache 230, an instruction execution unit 240 that executes an instruction, an instruction collection unit 250, and a core CLS selection unit 260. The core CLS selection unit 260 is an example of a first selection unit, The cache 230 determines a cache hit/miss based on, for example, an access request based on a load instruction executed by the instruction execution unit 240. At the time of a cache hit, the cache 230 outputs data in a cache line held corresponding to a hit address to the instruction execution unit 240. At the time of a cache miss, the cache 230 issues an access request to the LL cache 220, and holds data (cache line) received from the LL cache 220. Then, the cache 230 outputs the data in the held cache line to the instruction execution unit 240. The cache 230 is an example of a first cache. In this embodiment, a cache line size is set to 128 bytes (B) or 256 B in the cache 230 and the LL cache 220.

Figure 4:
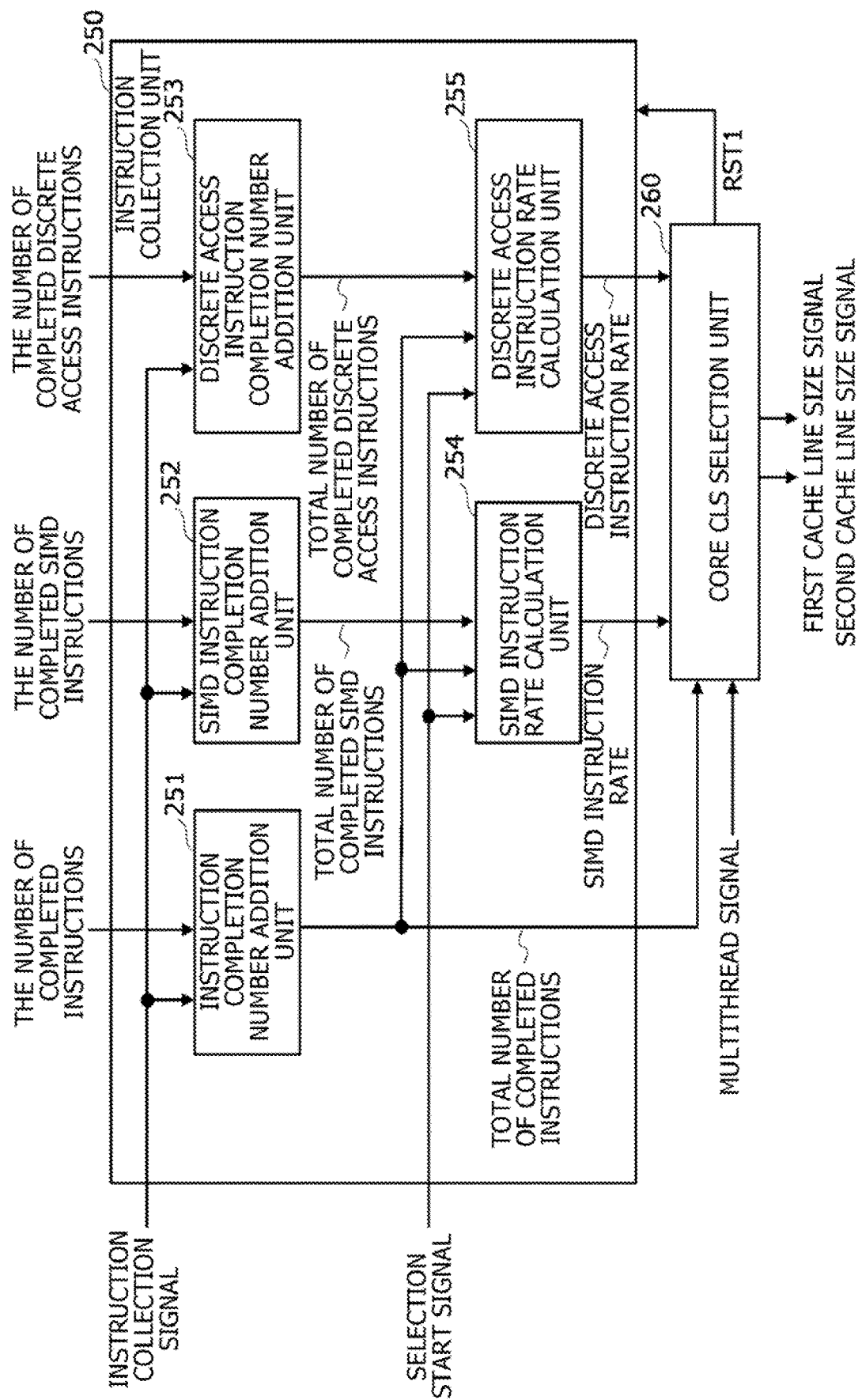
FIG. 4 is a block diagram illustrating examples of an instruction collection unit and a core cash line size (CLS) selection unit in FIG. 3.

The instruction collection unit 250 collects information regarding an instruction for which execution is completed by the instruction execution unit 240, calculates statistical information, and outputs the calculated statistical information to the core CLS selection unit 260. The core CLS selection unit 260 selects a cache line size of the cache 230 based on statistical information received from the instruction collection unit 250. The core CLS selection unit 260 outputs information indicating the selected cache line size to the CLS entry 280. Examples of the instruction collection unit 250 and the core CLS selection unit 260 are illustrated in FIG. 4.

The CLS entry 280 has a plurality of entries corresponding to the plurality of cores 210, and updates information regarding a corresponding entry based on information received from the core CLS selection unit 260 of each core 210. The group CLS selection unit 290 selects a cache line size used in the LL cache 220 and the cache 230 based on information regarding the plurality of cores 210, which is held in the CLS entry 280. Then, the group CLS selection unit 290 sets the selected cache line size to the LL cache 220 and the cache 230. Examples of the CLS entry 280 and the group CLS selection unit 290 are described with reference to FIG. 6.

Note that, although the example will be described in which this embodiment is applied to switching of a cache line size used in the LL cache 220 and the cache 230, this embodiment is also applicable to a case where a cache of another hierarchy exists between the LL cache 220 and the cache 230.

Figure 3:
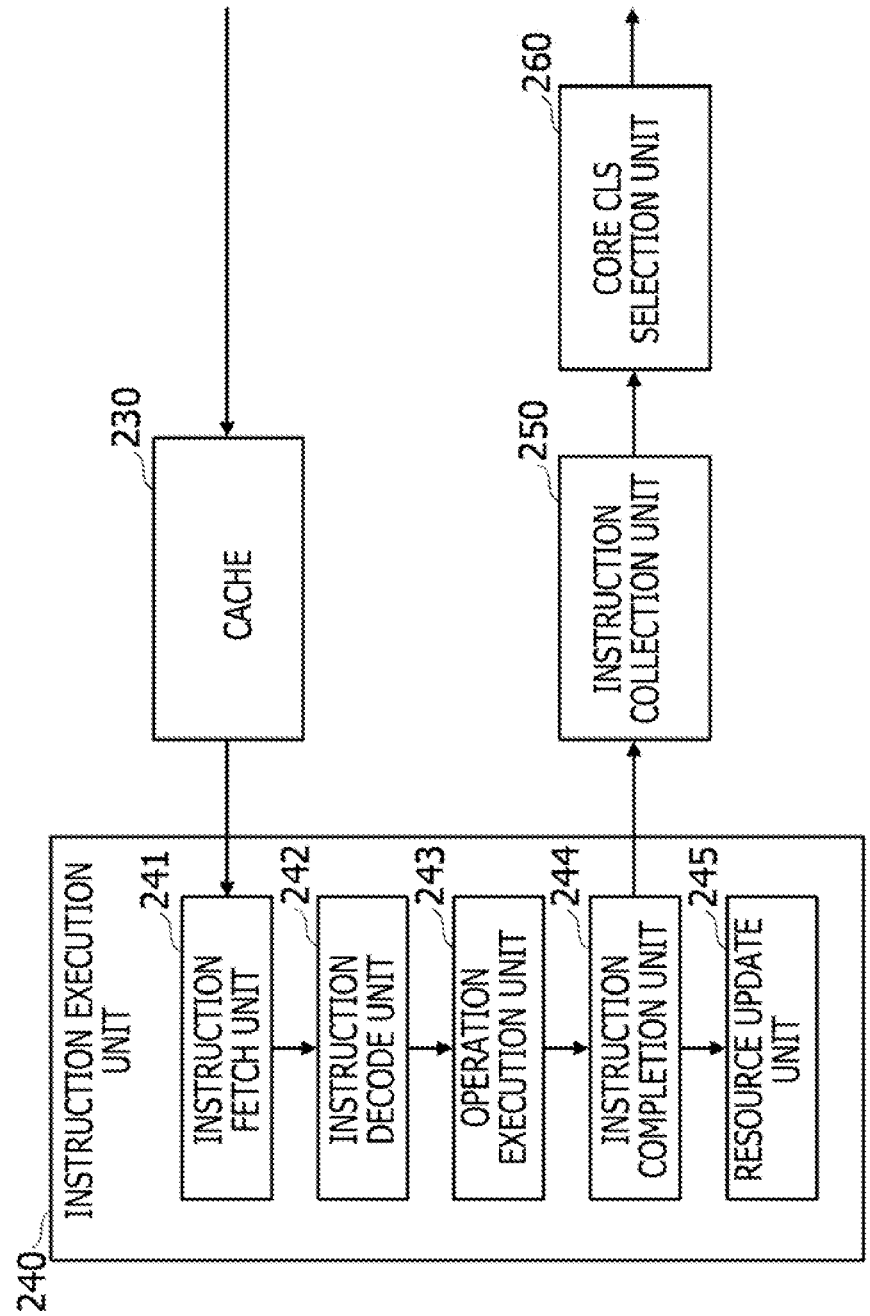
FIG. 3 is a block diagram illustrating an example of an instruction execution unit in FIG. 2.

FIG. 3 illustrates an example of the instruction execution unit 240 in FIG. 2. The instruction execution unit 240 includes an instruction fetch unit 241, an instruction decode unit 242, an operation execution unit 243, an instruction completion unit 244, and a resource update unit 245. The instruction fetch unit 241 issues an address indicated by a program counter, fetches, for example, an instruction held in the cache 230, and supplies the fetched instruction to the instruction decode unit 242. The instruction decode unit 242 decodes a received instruction to discriminate the instruction to be executed, and issues the discriminated instruction to the operation execution unit 243.

The operation execution unit 243 includes, for example, a reservation station and a plurality of types of operation units. Among instructions received from the instruction decode unit 242, the operation execution unit 243 sequentially inputs instructions ready to be executed to the operation units to cause the operation units to execute the instructions, and notifies the instruction completion unit 244 of the instructions for which execution is completed. The instruction completion unit 244 determines completion of execution of an instruction, and notifies the resource update unit 245 and the instruction collection unit 250 of information regarding the instruction for which execution is completed. The resource update unit 245 updates programmable resources such as the program counter and a register for an instruction for which execution is completed.

Instruction information notified by the instruction completion unit 244 to the instruction collection unit 250 will be described with reference to FIG. 4. The instruction collection unit 250 has a function of collecting completed instruction information from the instruction completion unit 244. The core CLS selection unit 260 has a function of selecting a cache line size preferable for use in the cache 230 based on instruction information collected by the instruction collection unit 250.

FIG. 4 illustrates examples of the instruction collection unit 250 and the core CLS selection unit 260 in FIG. 3. The instruction collection unit 250 includes an instruction completion number addition unit 251, a single instruction/multiple data (SIMD) instruction completion number addition unit 252, a discrete access instruction completion number addition unit 253, a SIMD instruction rate calculation unit 254, and a discrete access instruction rate calculation unit 255. The number of completed instructions, the number of completed SIMD instructions, and the number of completed discrete access instructions supplied to the instruction collection unit 250 are examples of instruction information output from the instruction completion unit 244.

The number of completed instructions indicates the number of instructions for which execution is completed by the instruction execution unit 240 during a generation cycle of an instruction collection signal. The number of completed SIMD instructions indicates the number of SIMD instructions for which execution is completed by the instruction execution unit 240 during the generation cycle of an instruction collection signal. The number of completed discrete access instructions indicates the number of discrete access instructions for which execution is completed by the instruction execution unit 240 during the generation cycle of an instruction collection signal. Each of the SIMD instruction and the discrete access instruction is an instruction type related to cache line size selection.

The SIMD instruction is a vector operation instruction used in high-performance computing (HPC) applications and the like. In a case where the SIMD instruction is executed, when a cache line size is longer, memory access efficiency may be improved, and performance of the CPU 100 is expected to be improved. The discrete access instruction is a type of the SIMD instruction, and is an instruction capable of discretely executing memory access. In a case where the discrete access instruction is executed, when a cache line size is shorter, cache hit efficiency may be improved, and performance of the CPU 100 is expected to be improved.

The instruction completion number addition unit 251 receives the number of completed instructions from the instruction completion unit 244 when an instruction collection signal is set to a valid level, and adds the received number of completed instructions to the already held number of completed instructions. The number of completed instructions is the number of instructions for which execution is completed by the instruction execution unit 240. The instruction completion number addition unit 251 outputs the number of completed instructions obtained by the addition as the total number of completed instructions to the SIMD instruction rate calculation unit 254 and the discrete access instruction rate calculation unit 255. The instruction completion number addition unit 251 is an example of an instruction count unit that counts the number of instructions for which execution is completed by the instruction execution unit 240.

The SIMD instruction completion number addition unit 252 receives the number of completed SIMD instructions from the instruction completion unit 244 when an instruction collection signal is set to a valid level, and adds the received number of completed SIMD instructions to the already held number of completed SIMD instructions. The number of completed SIMD instructions is the number of SIMD instructions for which execution is completed by the instruction execution unit 240. The SIMD instruction completion number addition unit 252 outputs the number of completed SIMD instructions obtained by the addition as the total number of completed SIMD instructions to the SIMD instruction rate calculation unit 254.

The discrete access instruction completion number addition unit 253 receives the number of completed discrete access instructions from the instruction completion unit 244 when an instruction collection signal is set to a valid level, and adds the received number of completed discrete access instructions to the already held number of completed discrete access instructions. The number of completed discrete access instructions is the number of discrete access instructions for which execution is completed by the instruction execution unit 240. The discrete access instruction completion number addition unit 253 outputs the number of completed discrete access instructions obtained by the addition as the total number of completed discrete access instructions to the discrete access instruction rate calculation unit 255. Each of the SIMD instruction completion number addition unit 252 and the discrete access instruction completion number addition unit 253 is an example of a type count unit that counts the number of instructions for which execution is completed by the instruction execution unit 240 for each type.

An instruction collection signal is generated for each core 210 at time intervals during a collection period repeated at a predetermined frequency by, for example, the instruction execution unit 240. Since the instruction collection signal is generated at time intervals, the instruction collection unit 250 does not need to add the numbers of all completed instructions, SIMD instructions, and discrete access instructions executed by the instruction execution unit 240. Thus, it is possible to reduce a circuit scale of a counter and the like mounted in each of the instruction completion number addition unit 251, the SIMD instruction completion number addition unit 252, and the discrete access instruction completion number addition unit 253.

In addition, the number of signal lines (number of bits) used for transmission of the total number of completed instructions, the total number of completed SIMD instructions, and the total number of completed discrete access instructions may be suppressed. Furthermore, since the number of bits of a signal used for calculation of an instruction rate in the SIMD instruction rate calculation unit 254 and the discrete access instruction rate calculation unit 255 may be suppressed, circuit scales of the SIMD instruction rate calculation unit 254 and the discrete access instruction rate calculation unit 255 may be reduced. As a result, a circuit scale of the CPU 100 may be suppressed as compared with a case where the number of various types of completed instructions is acquired without thinning out.

In response to reception of a selection start signal, the SIMD instruction rate calculation unit 254 calculates a SIMD instruction rate that is a ratio of the total number of completed SIMD instructions to the total number of completed instructions, and outputs the calculated SIMD instruction rate to the core CLS selection unit 260. The SIMD instruction rate calculation unit 254 is an example of a frequency calculation unit that calculates an execution frequency based on the number of instructions counted by the instruction completion number addition unit 251 and the number of SIMD instructions of a first type counted by the SIMD instruction completion number addition unit 252.

In response to reception of a selection start signal, the discrete access instruction rate calculation unit 255 calculates a discrete access instruction rate that is a ratio of the total number of completed discrete access instructions to the total number of completed instructions, and outputs the calculated discrete access instruction rate to the core CLS selection unit 260. A selection start signal is generated for each core 210 at the end of a collection period that repeatedly appears. The discrete access instruction rate calculation unit 255 is an example of a frequency calculation unit that calculates an execution frequency based on the number of instructions counted by the instruction completion number addition unit 251 and the number of discrete access instructions of a second type counted by the discrete access instruction completion number addition unit 253.

Thus, by adding each of the number of completed instructions by the instruction completion number addition unit 251, the SIMD instruction completion number addition unit 252, and the discrete access instruction completion number addition unit 253, an execution frequency for each type of an instruction may be calculated every time an instruction collection signal is received.

The core as selection unit 260 receives the total number of completed instructions, a SIMD instruction rate, and a discrete access instruction rate from the instruction collection unit 250, and receives a multithread signal from the instruction execution unit 240. Then, the core CLS selection unit 260 outputs a first cache line size signal and a second cache line size signal to the CLS entry 280 illustrated in FIG. 2 based on the total number of completed instructions, the SIMD instruction rate, the discrete access instruction rate, and the multithread signal.

For example, when selecting 128 B, the core CLS selection unit 260 outputs the first cache line size signal (for 128 B) in a valid level to the CLS entry 280 (FIG. 2) together with a core number that identifies the core 210. At this time, the second cache line size signal (for 256 B) is set to an invalid level.

When selecting 256 B, the core CLS selection unit 260 outputs the second cache line size signal in a valid level to the CLS entry 280 together with the core number. At this time, the first cache line size signal is set to an invalid level. When selecting neither 128 B nor 256 B, the core CLS selection unit 260 outputs the first cache line size signal in an invalid level and the second cache line size signal in an invalid level to the CLS entry 280 together with the core number. An example of the operation of the core CLS selection unit 260 will be described with reference to FIG. 5.

The core CLS selection unit 260 outputs a reset signal RST1 to the instruction collection unit 250 based on the output of the first cache line size signal and the second cache line size signal. In response to the reset signal RST1, each of the instruction completion number addition unit 251, the SIMD instruction completion number addition unit 252, and the discrete access instruction completion number addition unit 253 of the instruction collection unit 250 clears (resets) the number of completed instructions obtained by addition to "0". In response to the reset signal RST1, each of the SIMD instruction rate calculation unit 254 and the discrete access instruction rate calculation unit 255 clears (resets) the calculated instruction rate.

Then, each of the instruction completion number addition unit 251, the SIMD instruction completion number addition unit 252, and the discrete access instruction completion number addition unit 253 executes addition processing every time an instruction collection signal becomes a valid level in the next collection period. Each of the SIMD instruction rate calculation unit 254 and the discrete access instruction rate calculation unit 255 calculates an instruction rate in response to a selection start signal received at the end of the next collection period.

Note that a multithread signal in a valid level indicates that the core 210 is executing an instruction by multiple threads. A multithread signal in an invalid level indicates that the core 210 is executing an instruction by a single thread. The core CLS selection unit 260 may receive, instead of the multithread signal, a single thread signal indicating that the core 210 is executing an instruction by a single thread.

When an instruction is executed by multiple threads, data used for the instruction is likely to be held in a distributed manner in a plurality of non-continuous address areas. For this reason, at the time of execution of an instruction by multiple threads, it is preferable to reduce a cache line size to improve performance of the core 210. On the other hand, when an instruction is executed by a single thread, data used for the instruction is likely to be held collectively in a plurality of continuous address areas. For this reason, at the time of execution of an instruction by a single thread, it is preferable to increase a cache line size to improve performance of the core 210.

Figure 5:
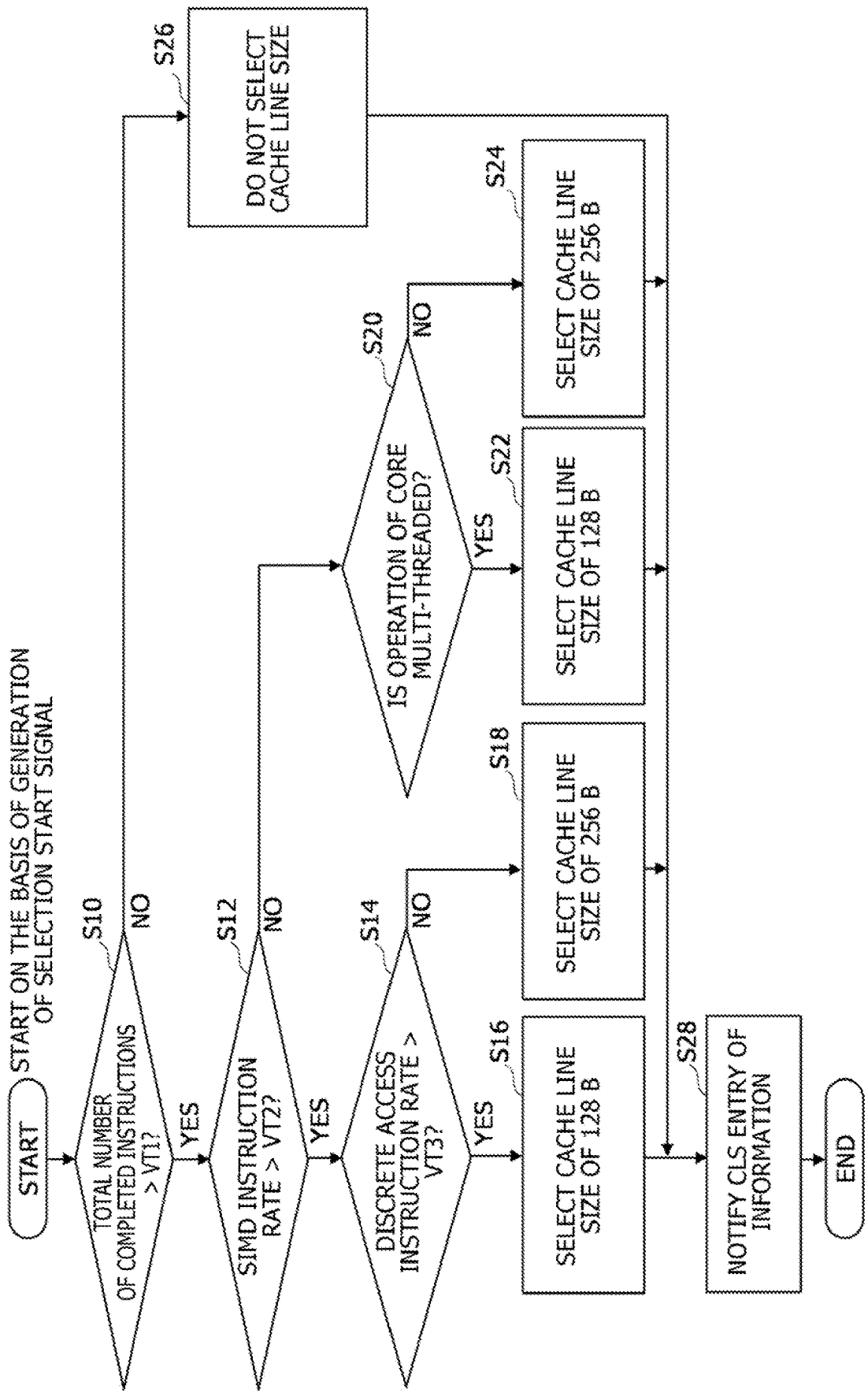
FIG. 5 is a flow diagram illustrating an example of an operation of the core CLS selection unit in FIG. 4.

FIG. 5 illustrates an example of the operation of the core CLS selection unit 260 in FIG. 4. FIG. 5 illustrates an example of a cache control method by the CPU 100. The operation illustrated in FIG. 5 is started based on reception of the total number of completed instructions, a SIMD instruction rate, a discrete access instruction rate, and a multithread signal by the core CLS selection unit 260.

First, when the total number of completed instructions is greater than a threshold VT1 in Step S10, the core CLS selection unit 260 determines that a cache line size may be selected based on the SIMD instruction rate or the discrete access instruction rate, and executes Step S12. When the total number of completed instructions is equal to or less than the threshold VT1, the core CLS selection unit 260 determines that it is difficult to determine characteristics of a program based on the SIMD instruction rate or the discrete access instruction rate, and executes Step S26. For example, when the total number of completed instructions is equal to or less than the threshold VT1, the core CLS selection unit 260 determines that an appropriate cache line size may not be selected.

When the SIMD instruction rate is greater than a threshold VT2 in Step S12, the core CLS selection unit 260 executes Step S14, and when the SIMD instruction rate is equal to or less than the threshold VT2 in Step S12, the core CLS selection unit 260 executes Step S20. When the discrete access instruction rate is greater than a threshold VT3 in Step S14, the core CLS selection unit 260 executes Step S16, and when the discrete access instruction rate is equal to or less than the threshold VT3 in Step S14, the core CLS selection unit 260 executes Step S18.

The core CLS selection unit 260 selects the cache line size of 128 B in Step S16, and executes Step S28. The core. CLS selection unit 260 selects the cache line size of 256 B in Step S18, and executes Step S28. As described above, the discrete access instruction is a type of the SIMD instruction.

In this embodiment, even when there is a plurality of instruction types having different preferable cache line sizes from each other in the SIMD instruction that is one of the instruction types, each core 210 may select an appropriate cache line size according to an execution frequency of each instruction type. Note that, in this embodiment, since selection of a cache line size is different from setting of a cache line size, the cache line size of the cache 230 is not changed at this point.

Although not particularly limited, for example, the threshold VT2 is 50% and the threshold VT3 is 25%. In this case, when a ratio of SIMD instructions to the total number of completed instructions exceeds 50% and a ratio of discrete access instructions to the total number of completed instructions exceeds 25%, the cache line size of 128 B is selected. When the ratio of the SIMD instructions to the total number of completed instructions exceeds 50% and the ratio of the discrete access instructions to the total number of completed instructions is equal to or less than 25%, the cache line size of 256 B is selected.

Note that the threshold VT3 may be set to, for example, a value of 50% of the SIMD instruction rate. In this case, when the number of executed discrete access instructions exceeds 50% of the total number of executed SIMD instructions, the cache line size of 128 B is selected, and when the number of executed discrete access instructions is equal to or less than 50% of the total number of executed SIMD instructions, the cache line size of 256 B is selected.

When the SIMD instruction rate is equal to or less than the threshold VT2 in Step S12, the core CLS selection unit 260 determines, in Step S20, whether or not the operation of the core 210 is multi-threaded. For example, the core CLS selection unit 260 determines whether or not the core 210 is executing an instruction by multiple threads. The core CLS selection unit 260 executes Step S22 when the operation of the core 210 is multi-threaded, and executes Step S24 when the operation of the core 210 is not multi-threaded (for example, single-threaded).

The core CLS selection unit 260 selects the cache line size of 128 B in Step S22, and executes Step S28. The core CLS selection unit 260 selects the cache line size of 256 B in Step S24, and executes Step S28. Thus, each core 210 may select an appropriate cache line size depending on whether an instruction is being executed by multiple threads or a single thread.

When the number of completed instructions is equal to or less than the threshold VT1 in Step S10, the core CLS selection unit 260 does not select a cache line size in Step S26 and executes Step S28. By suppressing selection of a cache line size by the core 210 in which the number of completed instructions is small and accuracy of calculation of an execution frequency for each type of an instruction may be low, deterioration in accuracy of cache line size selection may be suppressed.

In Step S28, the core CLS selection unit 260 notifies the CLS entry 280 of information indicating the selected cache line size, and terminates the operation illustrated in FIG. 5.

Note that FIGS. 4 and 5 illustrate examples of selecting a cache line size based on the SIMD instruction rate and the discrete access instruction rate. However, a cache line size may be selected based on instruction rates of a plurality of instruction types other than the SIMD instruction or the discrete access instruction. In addition, an example of selecting a cache line size depending on whether the operation of the core is multi-threaded or single-threaded is shown in Step S20. However, when the SIMD instruction rate is equal to or less than the threshold VT2 in Step S12, the cache line size of 128 B may be selected at all times. In addition, each of the thresholds VT1, VT2, and VT3 used for the cache line size selection may be changed according to a tendency of an instruction type executed by the core 210, and the like. The threshold VT1 is an example of a third threshold, the threshold VT2 is an example of a first threshold, and the threshold VT3 is an example of a second threshold.

Figure 6:
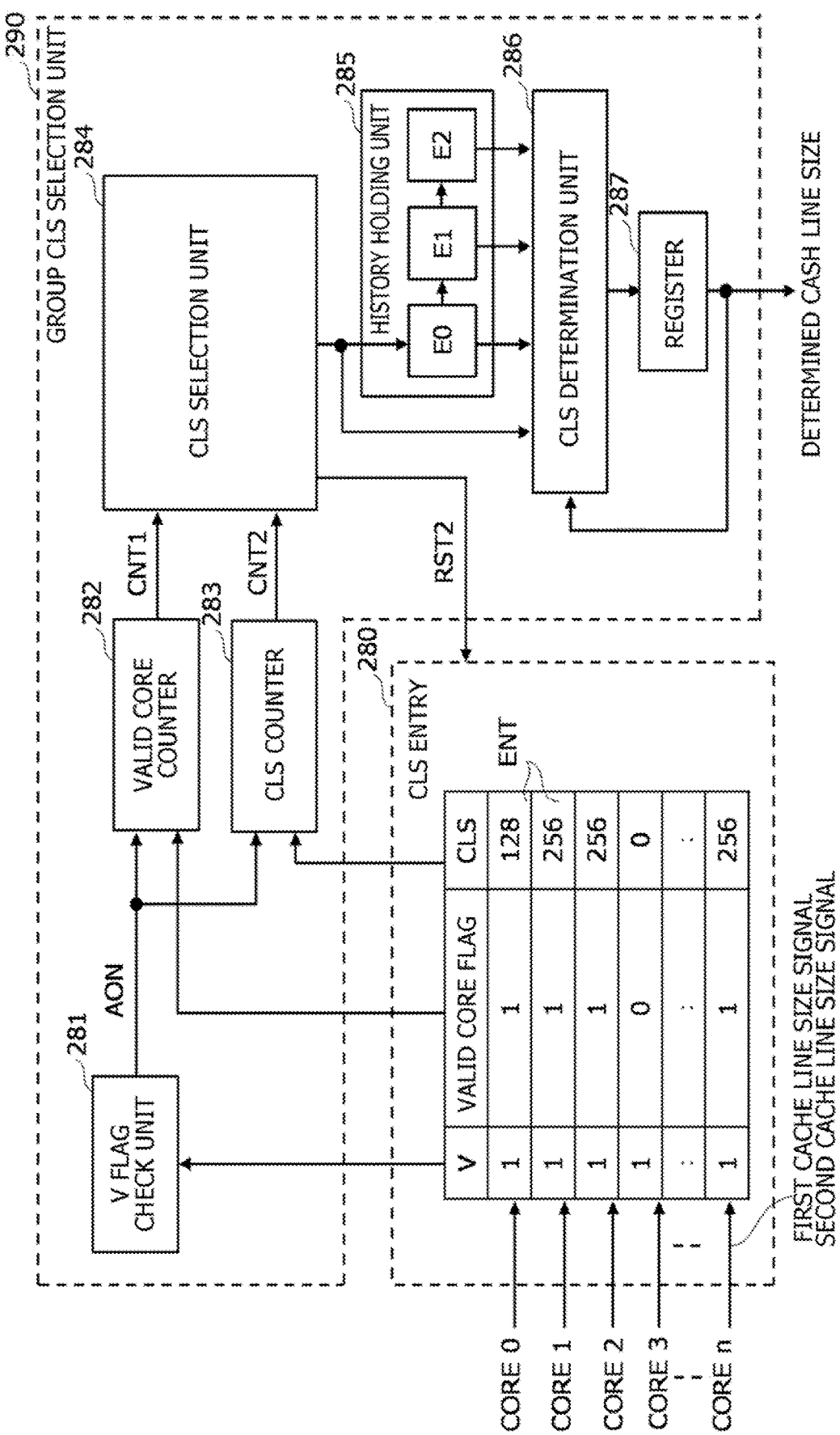
FIG. 6 is a block diagram illustrating examples of a CLS entry and a group CLS selection unit in FIG. 2.

FIG. 6 illustrates examples of the CLS entry 280 and the group CLS selection unit 290 in FIG. 2. The CLS entry 280 includes a plurality of entries ENT corresponding to n+1 (n is an integer of equal to or greater than 1) cores 210 mounted in the core group 200. Each entry ENT includes a valid flag V, a valid core flag, and a storage area CLS that stores a cache line size, which are set by an entry control unit (not illustrated) mounted in the CLS entry 280.

For example, each of the valid flag V, the valid core flag, and the storage area CLS includes a register. The valid flag V, the valid core flag, and the storage area CLS are set according to a first cache line size signal and a second cache line size signal sent from the core CLS selection unit 260 at the end of an instruction information collection period. The CLS entry 280 is an example of a cache line size holding unit. Note that, based on reception of a reset signal RST2, the CLS entry 280 dears the storage area CLS of each entry ENT, and resets the valid flag V and the valid core flag to an invalid state.

The CLS entry 280 sets the valid flag V to "1" when receiving the first cache line size signal in a valid level or an invalid level and the second cache line size signal in a valid level or an invalid level. The CLS entry 280 maintains the valid flag V at "0" (reset state) until receiving the first cache line size signal and the second cache line size signal. Note that, when receiving a valid signal indicating output of the first cache line size signal and the second cache line size signal from the core CLS selection unit 260, the CLS entry 280 may set logic of the received valid signal as the valid flag V.

The CLS entry 280 sets the valid core flag to "1" when receiving the first cache line size signal in a valid level and the second cache line size signal in a valid level. The CLS entry 280 sets the valid core flag to "0" when receiving the first cache line size signal in an invalid level and the second cache line size signal in an invalid level.

The CLS entry 280 sets "128" indicating selection of a cache line size of 128 B in the storage area CLS when receiving the first cache line size signal in a valid level. The CLS entry 280 sets "256" indicating selection of a cache line size of 256 B in the storage area CLS when receiving the second cache line size signal in a valid level. The as entry 280 sets "0" indicating non-selection of a cache line size in the storage area CLS when receiving the first cache line size signal in an invalid level and the second cache line size signal in an invalid level. Note that "128" and "256" respectively indicating 128 B and 256 B stored in the storage area CLS may be other values. In addition, the first cache line size signal and the second cache line size signal are not set to a valid level at the same time.

The group CLS selection unit 290 includes a V flag check unit 281, a valid core counter 282, a CLS counter 283, a CLS selection unit 284, a history holding unit 285, a CLS determination unit 286, and a register 287. The group CLS selection unit 290 operates at the end of the instruction information collection period.

The V flag check unit 281 checks the valid flag V in the CLS entry 280, and when the valid flag V is set in all the entries ENT, outputs an all-on signal AON to the valid core counter 282 and the CLS counter 283.

For example, since the plurality of cores 210 operates asynchronously with each other, an end timing of the instruction information collection period is different for each core 210. Thus, the V flag check unit 281 detects that the first cache line size signal and the second cache line size signal are received from all the cores 210 by detecting that the valid flag V is set in all the entries ENT. For example, by providing the valid flag V in each entry ENT, even when the collection period is different for each core 210, it is possible to detect that cache line size selection information is received from all the cores 210.

The valid core counter 282 counts, based on reception of an all-on signal AON, the number of entries ENT in which the valid core flag is set to "1" among all the entries ENT of the CLS entry 280, and generates a count value CNT1. The valid core counter 282 outputs the generated count value CNT1 to the CLS selection unit 284.

The CLS counter 283 counts, based on reception of an all-on signal AON, the number of entries ENT in which "256" is set in the storage area CLS among all the entries ENT of the CLS entry 280, and generates a count value CNT2. The CLS counter 283 outputs the generated count value CNT2 to the CLS selection unit 284.

The CLS selection unit 284 calculates, based on the count values CNT1 and CNT2, a ratio of the cores 210 each selected the cache line size of 256 B among the valid cores 210. Thus, by providing the valid core flag and the storage area CLS that stores a cache line size in the CLS entry 280, it is possible to calculate the ratio of cores 210 each selected the cache line size of 256 B among valid cores 210. The CLS selection unit 284 is an example of a second selection unit.

According to the calculated ratio, the CLS selection unit 284 selects a cache line size preferably set in the LL cache 220 and the cache 230. The CLS selection unit 284 outputs information indicating the selected cache line size to the history holding unit 285 and the CLS determination unit 286. In addition, the CLS selection unit 284 outputs the reset signal RST2 to the CLS entry 280 based on the output of the information indicating the cache line size. Note that, since selection of a cache line size is different from setting of a cache line size, the cache line size used in the LL cache 220 and the cache 230 is not changed at this point.

The history holding unit 285 includes entries E0 to E2 that sequentially hold cache line sizes selected at completion of past three collection periods. For example, each of the entries E0 to E2 includes a first-in first-out (FIFO) or a shift register. When receiving a cache line size from the CLS selection unit 284, the history holding unit 285 holds the received cache line size in the entry E0. At this time, the cache line size held in the entry E2 is discarded, and the cache line sizes held in the entries E0 and E1 are moved to the entries E1 and E2, respectively. The history holding unit 285 outputs the held cache line sizes to the CLS determination unit 286. Note that the number of entries E0 to E2 that hold the cache line sizes in the history holding unit 285 is not limited to three.

The CLS determination unit 286 receives a cache line size that is selected at completion of the latest collection period and is output by the CLS selection unit 284, and three cache line sizes output by the history holding unit 285. Then, the CLS determination unit 286 determines a cache line size to be set in the LL cache 220 and the cache 230 based on the four cache line sizes. For example, the CLS determination unit 286 determines whether or not all of the cache line size received from the CLS selection unit 284 and the three cache line sizes held in the history holding unit 285 match.

When all of the cache line sizes match, the CLS determination unit 286 determines the cache line size received from the CLS selection unit 284 as the cache line size to be set in the LL cache 220 and the cache 230. When even one cache line size is different, the CLS determination unit 286 determines maintenance of a currently set cache line size.

Thus, by using the history holding unit 285, it is possible to suppress switching of a cache line size every collection period, and to reduce a frequency of occurrence of a period in which a plurality of cache line sizes is mixed after switching a cache line size. As a result, it is possible to reduce a frequency of data removal processing for reducing the mixture of a plurality of cache line sizes, and to improve cache efficiency in a plurality of collection periods.

The CLS determination unit 286 stores the determined cache line size in the register 287, and the cache line size stored in the register 287 is set as the cache line size used in the LL cache 220 and the cache 230. Thereafter, the LL cache 220 and the cache 230 process a memory access instruction according to the set cache line size. Note that the cache line size held in the register 287 is fed back to the CLS determination unit 286, and is used when the CLS determination unit 286 determines maintenance of the cache line size, Thus, the group CLS selection unit 290 may appropriately switch a cache line size according to an execution frequency of each of a plurality of type of instructions having different cache line sizes from each other, suitable for improvement of cache efficiency. As a result, as compared with a case where a cache line size is not switched, the cache efficiency may be improved and processing performance of the CPU 100 may be improved.

Figure 7:
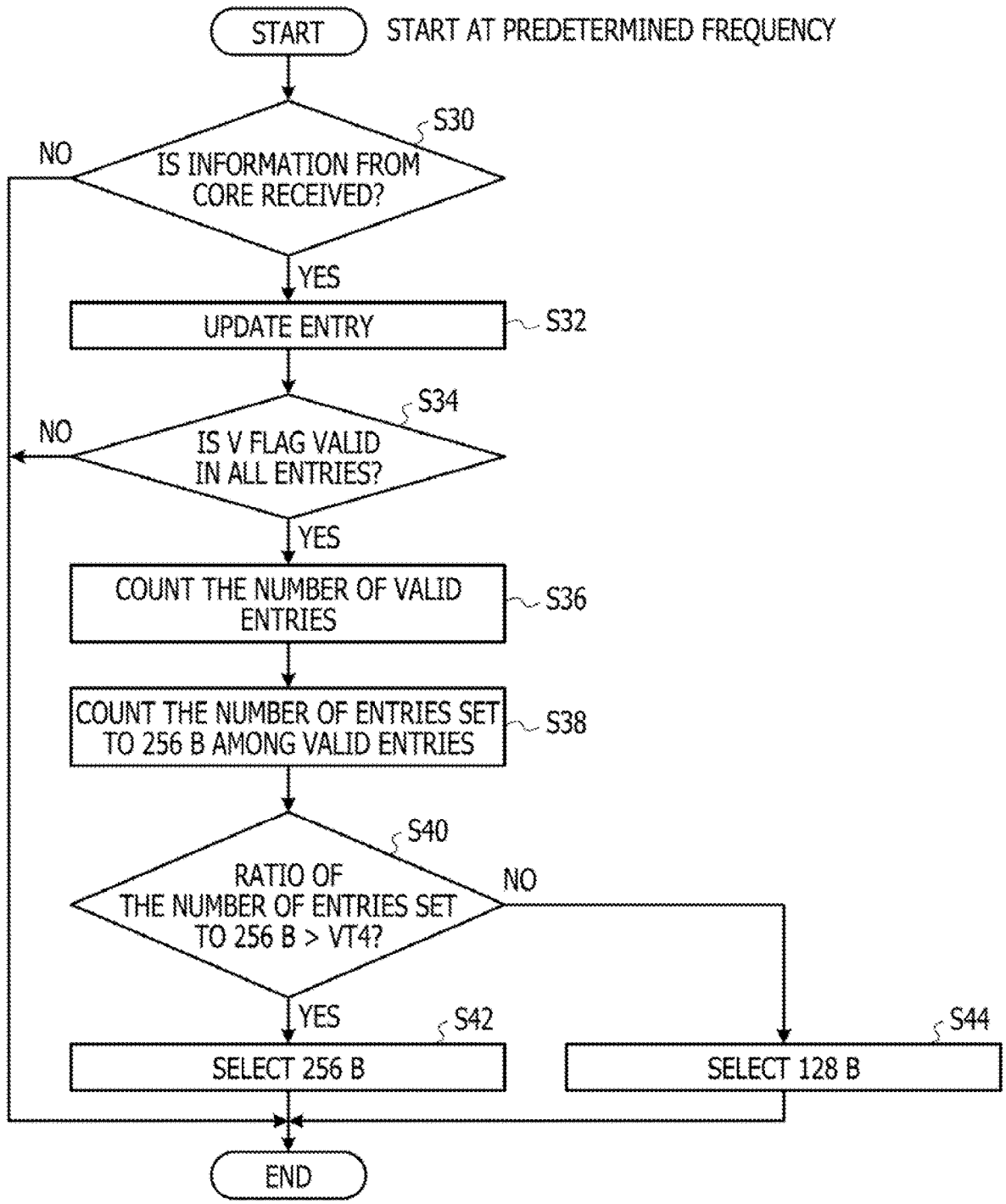
FIG. 7 is a flow diagram illustrating an example of operations of the CLS entry, a V flag check unit, a valid core counter, a CLS counter, and a CLS selection unit in FIG. 6.

FIG. 7 illustrates an example of operations of the CLS entry 280, the V flag check unit 281, the valid core counter 282, the CLS counter 283, and the CLS selection unit 284 in FIG. 6. FIG. 7 illustrates an example of the cache control method by the CPU 100. The operation illustrated in FIG. 7 is started at a frequency higher than a generation frequency of an instruction collection signal, for example.

First, when receiving information from any of the cores 210 in step S30, the CLS entry 280 executes Step S32, and when not receiving information, the CLS entry 280 terminates the operation illustrated in FIG. 7. The information received from the core 210 is a cache line size to be selected, and is indicated by a first cache line size signal and a second cache line size signal.

In Step S32, the CLS entry 280 updates an entry ENT corresponding to the core 210 that output the information. For example, when receiving information indicating selection of a cache line size, the CLS entry 280 sets the valid flag V and the valid core flag to a valid state, and stores the cache line size to be selected in the cache line size storage area CLS. When receiving information indicating non-selection of a cache line size, the CLS entry 280 sets the valid flag V to a valid state, sets the valid core flag to an invalid state, and stores "0" indicating the non-selection in the storage area CLS that stores a cache line size.

Next, when the valid flag V is set to a valid state in all the entries ENT of the CLS entry 280 in Step S34, the V flag check unit 281 causes the valid core counter 282 to execute Step S36. When any valid flag V of the entries ENT of the CLS entry 280 is set to an invalid state, the V flag check unit 281 terminates the operation illustrated in FIG. 7 because there is a core 210 which has not received the information regarding a cache line size.

In Step S36, the valid core counter 282 reads the valid core flag from each entry ENT of the CLS entry 280 and counts the number of entries ENT in which the valid core flag is set to "1". Next, in Step S38, the CLS counter 283 counts the number of entries ENT in which the storage area CLS that stores a cache line size is set to 256 B among the entries ENT in which the valid core flag is set to "1" (valid state). Steps S36 and 538 may be executed in reverse order.

Next, when a ratio of the number of entries ENT set to 256 B to the number of valid entries exceeds a threshold VT4 in Step S40, the CLS selection unit 284 executes Step S42. When the ratio of the number of entries ENT set to 256 B to the number of valid entries is equal to or less than the threshold VT4, the CLS selection unit 284 executes Step S44.

In Step S42, the CLS selection unit 284 selects 256 B as a cache line size preferably set in the LL cache 220 and the cache 230, and terminates the operation illustrated in FIG. 7. In Step S44, the CLS selection unit 284 selects 128 B as a cache line size preferably set in the LL cache 220 and the cache 230, and terminates the operation illustrated in FIG. 7.

For example, the threshold VT4 is 50%. In this case, a cache line size selected by the group CLS selection unit 290 is selected by decision by majority of cache line sizes selected by the plurality of cores 210. Note that the threshold VT4 may be changed to a value exceeding 50% according to a tendency of an instruction type executed by the core 210, and the like.

In addition, in Step S38, the number of entries ENT set to 256 B is counted, but the number of entries ENT set to 128 B may be counted. In this case, in Step S40, it is determined whether or not a ratio of the number of entries ENT set to 128 B exceeds the threshold VT4. The threshold VT4 used to determine the ratio of the number of entries ENT set to 128 B may be different from the threshold VT4 used to determine the ratio of the number of entries ENT set to 256 B.

Figure 8:
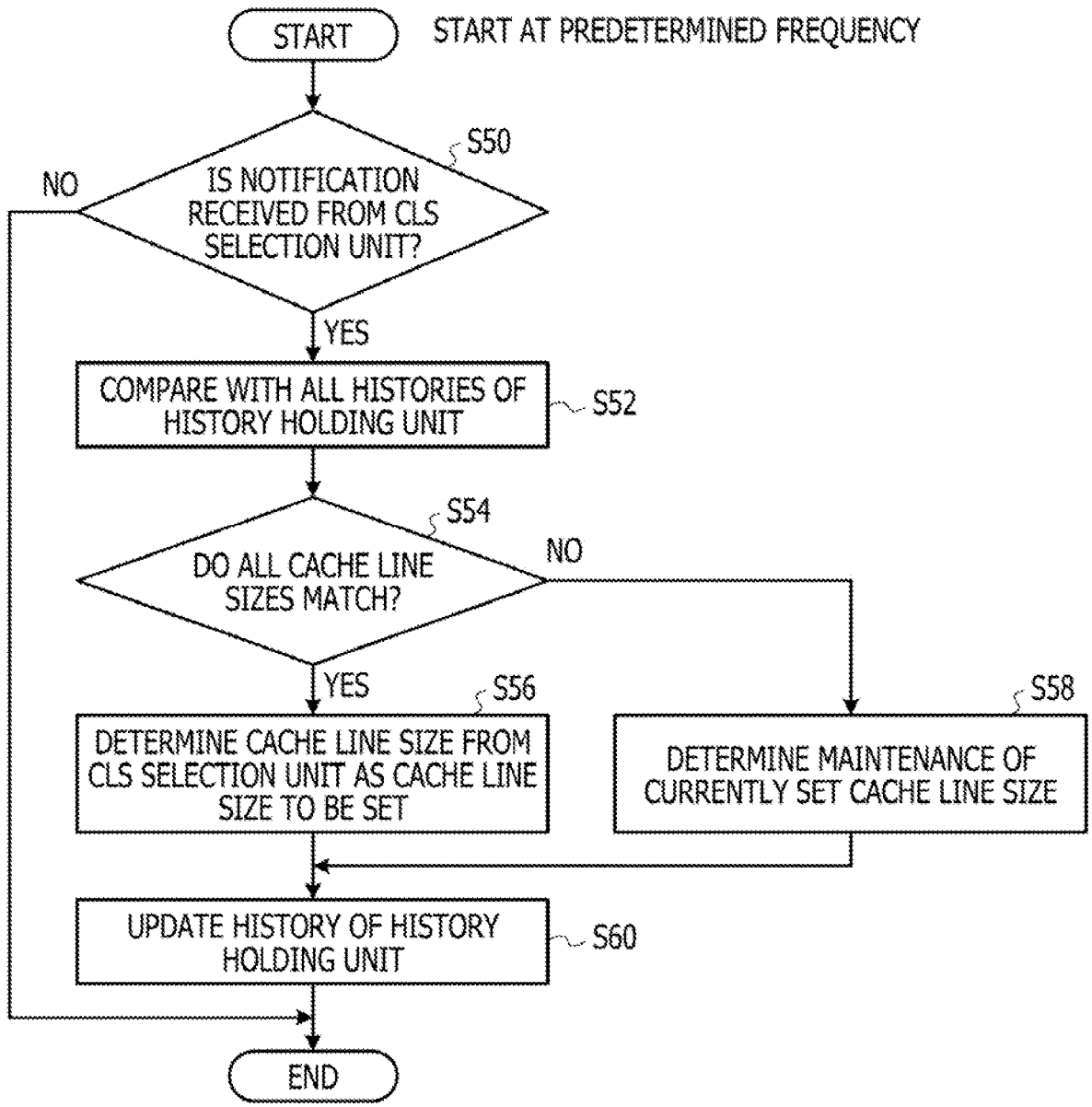
FIG. 8 is a flow diagram illustrating an example of operations of a CLS determination unit and a history holding unit in FIG. 6.

FIG. 8 illustrates an example of operations of the CLS determination unit 286 and the history holding unit 285 in FIG. 6. FIG. 8 illustrates an example of the cache control method by the CPU 100. The operation illustrated in FIG. 8 is started at a frequency similar to a generation frequency of an instruction collection signal, for example.

First, when receiving notification of a selected cache line size from the CLS selection unit 284 in Step S50, the CLS determination unit 286 executes Step S52. When not receiving notification of a selected cache line size from the CLS selection unit 284, the CLS determination unit 286 terminates the operation of FIG. 8.

In Step S52, the CLS determination unit 286 compares the cache line size received from the CLS selection unit 284 with cache line sizes held in all the entries E0 to E2 of the history holding unit 285. Next, when all the cache line sizes match in Step S54, the CLS determination unit 286 executes Step S56, and when even one cache line size does not match, the CLS determination unit 286 executes Step S58.

In Step S56, the CLS determination unit 286 determines the cache line size received from the CLS selection unit 284 as a cache line size to be set in the LL cache 220 and the cache 230.

In Step S58, the CLS determination unit 286 determines maintenance of a cache line size currently set in the LL cache 220 and the cache 230. The CLS determination unit 286 stores the cache line size determined in Step S56 or S58 in the register 287, and executes Step S60. The cache line size stored in the register 287 is set as the cache line size used in the LL cache 220 and the cache 230.

In Step S60, the CLS determination unit 286 updates the history holding unit 285 by storing the cache line size received from the CLS selection unit 284 in the entry EU of the history holding unit 285, and ends the operation illustrated in FIG. 8. Note that, as described with reference to FIG. 6, cache line sizes already held in the entries E0 and E1 are sequentially shifted to the entries E1 and E2.

Figure 9:
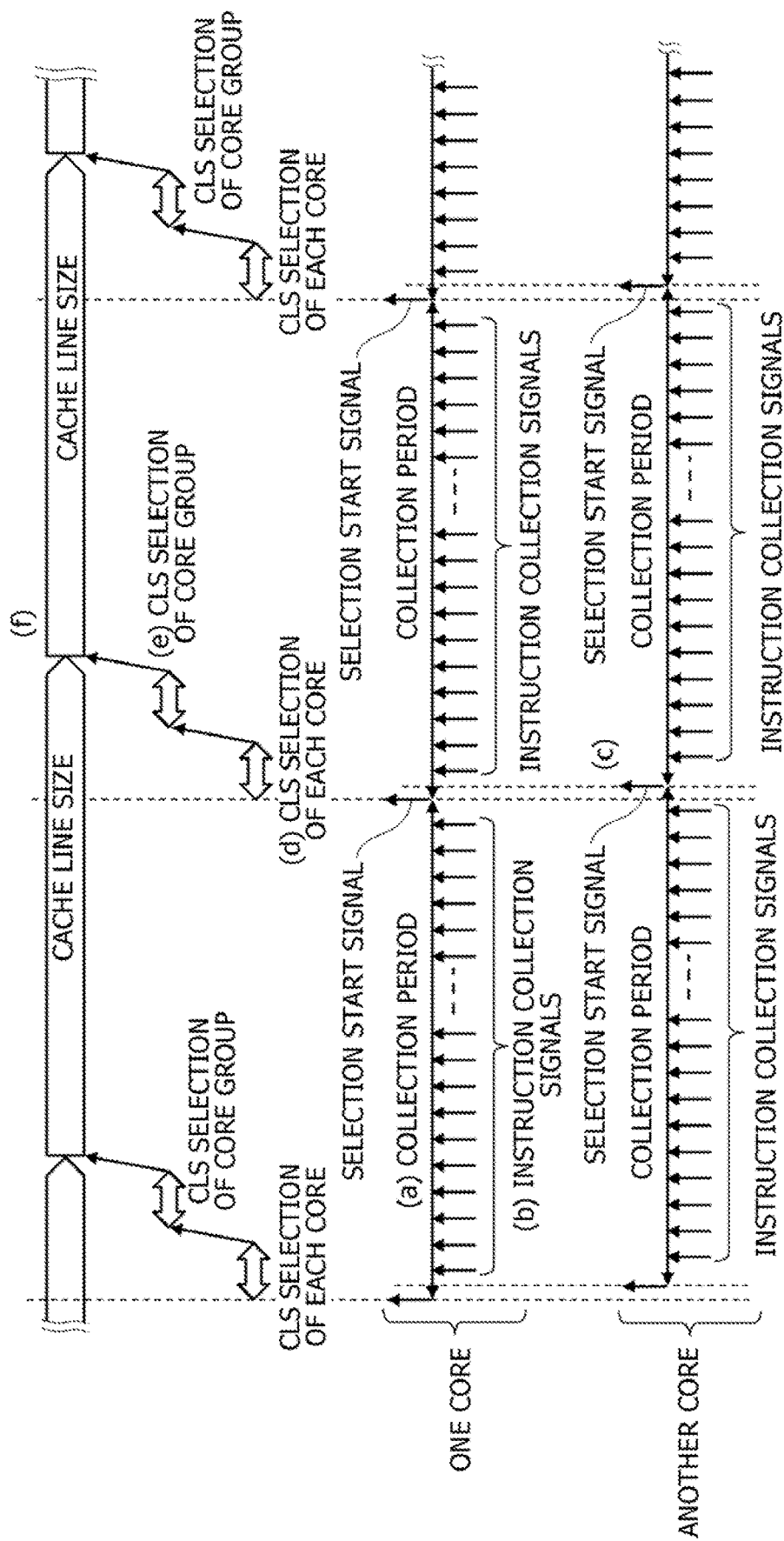
FIG. 9 is a timing diagram illustrating an example of a cache line size switching operation for each core group of a central processing unit (CPU) in FIG. 1.

FIG. 9 illustrates an example of a cache line size switching operation for each core group 200 of the CPU 100 in FIG. 1. The plurality of cores 210 in each core group 200 repeats a collection period ((a) of FIG. 9). In each collection period, the instruction collection unit 250 of each core 210 adds each of the number of completed instructions, the number of completed SIMD instructions, and the number of completed discrete access instructions every time an instruction collection signal is received ((b) of FIG. 9).

FIG. 9 illustrates the operations of the instruction collection unit 250 and the core CLS selection unit 260 in two of the plurality of cores 210. Although the collection periods of the plurality of cores 210 overlap with each other, since they are not synchronized, they are deviated ((c) of FIG. 9). Thus, generation timings of selection start signals in the plurality of cores 210 may be deviated by about one cycle of the instruction collection signals at the maximum. However, the V flag check unit 281 illustrated in FIG. 6 may absorb the deviation of the collection periods.

The CLS entry 280 stores information regarding a cache line size selected by each core 210 in the entry ENT every time a collection period of each core 210 ends ((d) of FIG. 9). When the collection periods of all the cores 210 have ended, the CLS selection unit 284 selects, based on the cache line sizes selected by the cores 210, a cache line size preferably set in the LL cache 220 and the cache 230 ((e) of FIG. 9). Then, the CLS determination unit 286 sets the cache line size in the LL cache 220 and the cache 230 based on the cache line size selected by the CLS selection unit 284 and cache line sizes held in the history holding unit 285 ((f) of FIG. 9).

The setting of the cache line size in the LL cache 220 and the cache 230 is executed every lapse of the collection period. Thus, for each core group 200, the same cache line size may be set in the LL cache 220 and the cache 230 of each core, and switching to an appropriate cache line size may be executed at a predetermined frequency according to the operation of the core 210. At this time, information regarding all instructions to be executed during a collection period is not collected, but information regarding instructions is collected in synchronization with an instruction collection signal generated in a predetermined cycle. Therefore, a circuit scale of the instruction collection unit 250 may be reduced as compared with the case where information regarding all instructions is collected.

Note that, in FIG. 9, a cache line size appears to be switched every time a collection period ends. In practice, however, the cache line size is only re-selected and is not successively switched every collection period. This is because the cache line size is switched only when the cache line size selected by the CLS selection unit 284 matches all the cache line sizes held in the history holding unit 285. When the history holding unit 285 includes three entries E0 to E2, the cache line size is switched at the shortest every four collection periods.

Note that, when the cache line size is switched, a plurality of cache line sizes is mixed in the LL cache 220 and the cache 230. For example, when the cache line size is switched to 256 B, and data of 256 B is stored in two cash lines of 128 B with different addresses, after one piece of data of 128 B is removed, requested data of 256 B is stored. Thus, the mixture of a plurality of cache line sizes is gradually reduced, and cache efficiency is lowered until the mixture is reduced.

As described above, in this embodiment, in the CPU 100 including the LL cache 220 shared by the plurality of cores 210 each including a cache, it is possible to perform switching to an appropriate cache line size based on an execution frequency for each type of an instruction in each core 210. This makes it possible to effectively use the LL cache 220 and the cache 230 when the CPU 100 is viewed as a whole.

Each core 210 selects a cache line size suitable for improvement of cache efficiency, which is use efficiency of the cache 230, based on an execution frequency for each type of an instruction executed in each collection period. The cache control unit 270 determines a cache line size to be used in the LL cache 220 and the cache 230 based on the cache line sizes selected by the cores 210. Thus, a cache line size may be appropriately switched according to an execution frequency of a plurality of types of instructions having different cache line sizes from each other, suitable for improvement of cache efficiency. As a result, since cache misses are reduced as compared with a case where the cache line size is not switched, the cache efficiency may be improved and processing performance of the CPU 100 may be improved.

By collecting the number of completed instructions for each type at time intervals during a collection period, it is possible to reduce a circuit scale of the instruction collection unit as compared with a case where the number of all completed instructions executed during the collection period for each type is collected.

Even when there is a plurality of instruction types having different preferable cache line sizes in an SIMD instruction that is one of the instruction types, each core 210 may select an appropriate cache line size according to an execution frequency for each type of an instruction. Then, based on an average execution frequency for each type of an instruction in the plurality of cores 210, a cache line size used in the LL cache 220 and the cache 230 may be determined.

The core 210 in which the number of completed instructions is small and accuracy of calculation of an execution frequency for each type of an instruction may be low does not select a cache line size. Therefore, deterioration in accuracy of cache line size selection by the CLS selection unit 284 may be suppressed.

Each core 210 may select an appropriate cache line size depending on whether an instruction is being executed by multiple threads or a single thread. Then, based on an average execution type (by multiple threads or a single thread) of instructions in the plurality of cores 210, a cache line size used in the LL cache 220 and the cache 230 may be determined.

When a cache line size selected by the CLS selection unit 284 and a plurality of cache line sizes held in the history holding unit 285 match, the CLS determination unit 286 determines use of the cache line size selected by the CLS selection unit 284. Thus, it is possible to suppress switching of a cache line size every collection period, and to reduce a frequency of occurrence of a period in which a plurality of cache line sizes is mixed after a cache line size is switched. As a result, it is possible to reduce a frequency of data removal processing for reducing the mixture of a plurality of cache line sizes, and to improve cache efficiency.

From the above detailed description, characteristics and advantages of the embodiment will become apparent. This intends that the appended claims cover the characteristics and advantages of the embodiment described above without departing from the spirit and the scope of the claims. In addition, any person having ordinary knowledge in the technical field may be easily come up with various improvements and modifications. Therefore, there is no intention to limit the scope of the inventive embodiment to those described above, and the scope of the inventive embodiment may rely on appropriate improvements and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
a plurality of cores each including an instruction execution circuit that executes an instruction and a first cache that holds at least one of an instruction and data used in the instruction execution circuit;
a second cache shared by the plurality of cores; and
a cache control circuit that controls switching of a cache line size used in the first cache and the second cache,
wherein each of the plurality of cores further including
an instruction collection circuit that collects, at time intervals during a collection period, a number of completed instructions for each type of the instructions that are executed by the instruction execution circuit, and calculates an execution frequency for each type of the instructions at an end of the collection period, and
a first selection circuit that selects a cache line size for use in the first cache based on the execution frequency calculated by the instruction collection circuit during the collection period, and
the cache control circuit determines a cache line size used in the first cache and the second cache based on cache line sizes selected by the first selection circuit of the plurality of cores.

2. The semiconductor device according to claim 1, wherein
when an execution frequency of instructions of a first type among instruction types exceeds a first threshold, the first selection circuit selects the cache line size for use in the first cache depending on whether an execution frequency of instructions of a second type among the instruction types exceeds a second threshold.

3. The semiconductor device according to claim 2, wherein
each of the plurality of cores executes instructions by a single thread or multiple threads, and
when the execution frequency of the instructions of the first type is equal to or less than the first threshold, the first selection circuit selects the cache line size for use in the first cache depending on whether an instruction is executed by the single thread or the multiple threads.

4. The semiconductor device according to claim 1, wherein
when the number of instructions executed by the instruction execution circuit during the collection period is equal to or less than a third threshold, the first selection circuit does not select a cache line size, and the cache line size used in the first cache and the second cache previously selected is maintained.

5. The semiconductor device according to claim 1, wherein
the cache control circuit includes
a second selection circuit that selects, at every completion of the collection period, a cache line size most selected by the first selection circuits of the plurality of cores as a cache line size for use in the first cache and the second cache,
a history holding circuit that holds a cache line size selected by the second selection circuit at every completion of a predetermined number of past collection periods, and
a cache line size determination circuit that determines, when a cache line size selected by the second selection circuit at completion of a latest collection period matches all of the plurality of cache line sizes held in the history holding circuit, the cache line size selected by the second selection circuit as the cache line size used in the first cache and the second cache.

6. The semiconductor device according claim 5, wherein
the cache control circuit includes a cache line size holding circuit including, corresponding to each of the plurality of cores, an entry including a valid flag to be set based on notification of selection or non-selection of a cache line size from the core, a valid core flag that identifies selection or non-selection of a cache line size, and a storage area that stores a cache line size selected by the core, and
when the valid flag is set in all the entries of the cache line size holding circuit, the second selection circuit selects a cache line size based on cache line sizes stored in the storage areas of the entries in each of which the valid core flag indicates selection of the cache line size.

7. The semiconductor device according to claim 1, wherein
the instruction collection circuit includes
an instruction count circuit that counts a number of instructions for which execution is completed by the instruction execution circuit,
a plurality of type count circuits each of which counts a number of instructions for which executions are completed by the instruction execution circuit for each type, and
a frequency calculation circuit that calculates an execution frequency, for each type of the instructions, based on the number of instructions counted by the instruction count circuit and the number of instructions counted by each of the plurality of type count circuit for each type.

8. The semiconductor device according to claim 1, wherein each type of the instructions includes one of single instruction/multiple data (SIMD) instruction and a discrete access instruction.

9. A cache control method for switching a cache line size in a semiconductor device comprising:
a plurality of cores each including an instruction execution circuit that executes an instruction and a first cache that holds at least one of an instruction and data used in the instruction execution circuit; and
a second cache shared by the plurality of cores;
the method including:
collecting, for each of the plurality of cores, at time intervals during a collection period, a number of completed instructions for each type of the instructions that are executed by the instruction execution circuit;
calculating, for each of the plurality of cores, an execution frequency for each type of the instructions at an end of the collection period,
selecting, for each of the plurality of cores, a cache line size for use in the first cache based on the execution frequency calculated, and
determining a cache line size used in the first cache and the second cache based on cache line sizes selected for the plurality of cores.

10. The cache control method according to claim 9, wherein
the selecting selects the cache line size for use in the first cache depending on whether an execution frequency of instructions of a second type among the instruction types exceeds a second threshold when an execution frequency of instructions of a first type among instruction types exceeds a first threshold.

11. The cache control method e according to claim 10, wherein
each of the plurality of cores executes instructions by a single thread or multiple threads, and
when the execution frequency of the instructions of the first type is equal to or less than the first threshold, the selecting selects the cache line size for use in the first cache depending on whether an instruction is executed by the single thread or the multiple threads.

12. The cache control method according to claim 9, wherein
when the number of instructions executed during the collection period is equal to or less than a third threshold, the cache line size is not selected, and the cache line size used in the first cache and the second cache previously selected is maintained.

13. The cache control method according to claim 9, further comprising:
selecting, at every completion of the collection period, a cache line size most selected by first selection circuits of the plurality of cores as a cache line size for use in the first cache and the second cache,
holding a cache line size selected by a second selection circuit at every completion of a predetermined number of past collection periods, and
determining, when a cache line size selected by the second selection circuit at completion of a latest collection period matches all of the plurality of cache line sizes held in the history holding circuit, the cache line size selected by the second selection circuit as the cache line size used in the first cache and the second cache.

14. The cache control method according claim 13, wherein
the holding holds a cache line size corresponding to each of the plurality of cores, an entry including a valid flag to be set based on notification of selection or non-selection of a cache line size from the core, a valid core flag that identifies selection or non-selection of a cache line size, and a storage area that stores a cache line size selected by the core, and
when the valid flag is set in all the entries of a cache line size holding circuit, selecting a cache line size based on cache line sizes stored in the storage areas of the entries in each of which the valid core flag indicates selection of the cache line size.

15. The cache control method according to claim 9, further comprising:
counting a number of instructions for which execution is completed by the instruction execution circuit,
counting, with a plurality of type count circuits, a number of instructions for which executions are completed by the instruction execution circuit for each type, and
calculating an execution frequency, for each type of the instructions, based on the number of instructions counted by the instruction count circuit and the number of instructions counted by each of the plurality of type count circuit for each type.

16. The cache control method according to claim 9, wherein each type of the instructions includes one of single instruction/multiple data (SIMD) instruction and a discrete access instruction.

* * * * *